April 19, 1955  J. HALLER  2,706,693
PROCESS OF IMPREGNATING METAL BEARINGS
Filed Feb. 10, 1951

Inventor
John Haller
Barthel & Bugbee
Attorneys

United States Patent Office 2,706,693
Patented Apr. 19, 1955

2,706,693

PROCESS OF IMPREGNATING METAL BEARINGS

John Haller, Northville, Mich., assignor, by mesne assignments, to Allied Products Corporation, Detroit, Mich., a corporation of Michigan Application February 10, 1951, Serial No. 210,368

6 Claims. (Cl. 117—71)

This invention relates to powder metallurgy and, in particular, to powdered metal bearings and processes of making such bearings.

One object of this invention is to provide a process of improving the bearings qualities of powdered metal bearings by infiltrating them with metals capable of imparting such improved qualities to the bearings.

Another object is to provide a process of improving the bearing qualities of powdered metal bearings which have already been infiltrated with other metals, such as copper or copper-zinc alloy, by reinfiltrating the previously infiltrated and sintered bearing with another metal, such as antimony.

Powdered metal bearings, as hitherto made from powdered iron, have not possessed the best bearing qualities as regards the reduction of friction even after they have been infiltrated with copper or copper-zinc alloy. While this infiltration increases the density and strength of the bearing, the copper in the iron at the bearing surface imparts a considerable amount of friction to a rotating or sliding part engaging this bearing surface. Powdered bronze bearings can be infiltrated with lead but the lead tends to smear over the bearing surface when heavy loads are impressed upon it, closing the pores of the bearing and reducing the lubrication. This is especially true where the bearing is a so-called oil well bearing containing an internal reservoir filled with lubricant, which must seep through the pores to the bearing surface.

The present invention improves the bearing qualities of a powdered metal bearing by reinfiltrating the bearing with antimony, giving a great reduction in friction as regards a machine part which is rotating or sliding relatively to the bearing surface. Antimony is harder than lead and does not smear the bearing surface and close the pores, as does lead.

Figure 1:
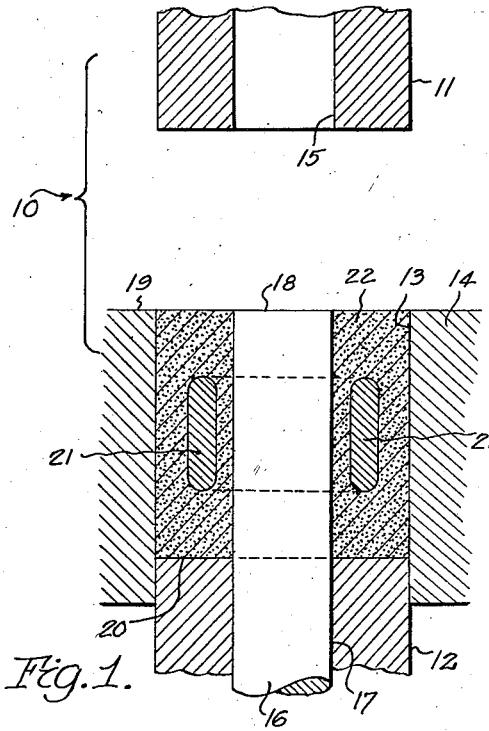
Figure 1 is a diagrammatic central vertical section through a portion of a briquetting press showing a powdered metal bearing charge about to be briquetted.
Figure 2:
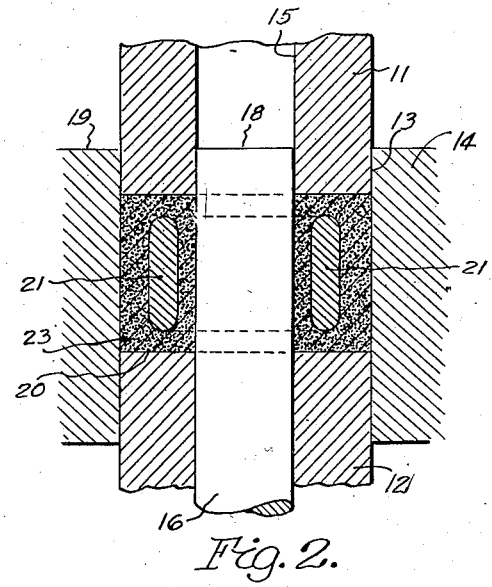
Figure 2 is a view similar to Figure 1, but showing the positions of the parts after briquetting.

Referring to the drawings in detail, Figures 1 and 2 show briefly two of the operations of making an oil well bearing. In Figure 1, there is shown diagrammatically a portion of a briquetting press 10 having upper and lower plungers 11 and 12 respectively reciprocable into and out of the bore 13 of a die 14. The upper plunger 11 has a bore 15 for receiving a core rod 16 which is adjustable vertically and which passes through a bore 17 in the lower plunger 12.

In making an oil well bearing, the core rod 16 and lower plunger 12 are moved into the positions shown in Figure 1 with the top 18 of the core rod 16 approximately at the level of the top surface 19 of the die 14, and with the top 20 of the lower plunger 12 located in the die bore 13 at a predetermined distance below the top surface 19 of the die 14. The bore 13 is then filled with powdered metal, such as powdered iron, to a predetermined level, a core or insert 21 of infiltratable metal, such as copper-zinc alloy, placed on top of this level, and the filling of the bore 13 or die cavity completed up to the top surface 19 of the die 14. In order to produce an annular oil well, the core or insert 21 is of annular shape corresponding in size and shape to the size and shape of the reservoir or void which it is intended to produce in the bearing.

When the filling of the bore or die cavity 13 has been completed, the upper and lower plungers 11 and 12 are moved toward one another in the die cavity or bore 13, compressing or "briquetting" the charge 22 of powdered iron containing the insert 21, and forming an unsintered bearing body, generally designated 23. The unsintered bearing body 23 is now transferred to a sintering oven and raised to a suitably high temperature to sinter the briquetted powdered iron mass. For certain small bearings, a sintering temperature of 2020° F. for one-half hour has been found satisfactory but this time and temperature is given merely for guidance, as large bearings occasionally require longer periods or slightly higher temperatures.

Figure 4:
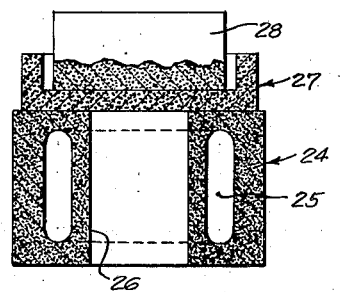
Figure 4 is a central vertical section showing the powdered metal bearing at the start of reinfiltration with a bearing-improving metal.

During the sintering operation, the insert or core 21 of copper or copper-zinc alloy melts and infiltrates into the pores of the powdered iron, leaving in its place a void or cavity having substantially the exact size and shape which the core or insert 21 previously possessed. The infiltrating metal increases the density of the powdered iron, as indicated by the darker stippling in Figure 4, and also enhances its strength. The unsintered bearing body 23, by reason of the sintering operation, becomes the sintered bearing, generally designated 24 shown in Figure 4, having a void or cavity 25 where the insert 21 was previously located. The bearing 24 has a bearing bore 26 which will rotatably support a rotary shaft when proper lubrication is applied. In order to still further reduce the friction at the bearing surface 26, the reinfiltration procedure of the present invention is now carried out.

In order to prevent the surface erosion which frequently occurs when infiltration is carried out from an external surface of the bearing, a porous cup or boat 27 is placed upon the upper end of the bearing 24. This cup or boat 27 is preferably made of porous sintered powdered metal of the same kind as the metal being infiltrated, a boat of coarse sintered powdered iron being preferably used when a powdered iron article is being infiltrated. A piece of reinfiltrating metal 28 suitable for improving the bearing qualities of the bearing bore 26 and of suitable weight is placed in the cup 27 (Figure 4) on top of the bearing 24 and this assembly transferred again to a sintering oven and resintered. Antimony has been found satisfactory as a reinfiltrating metal, also mixtures of antimony and lead, antimony and tin, lead and tin, lead alone and tin alone.

Figure 5:
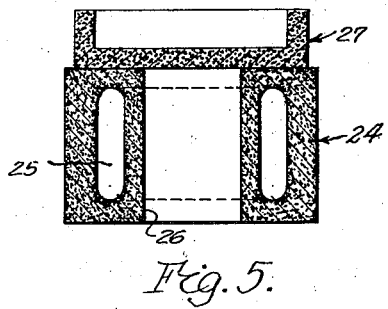
Figure 5 is a view similar to Figure 4 showing the bearing after reinfiltration has been accomplished.
Figure 3:
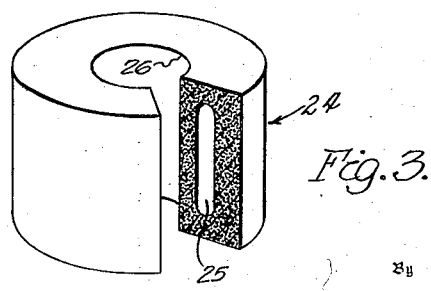
Figure 3 is a perspective view partly in vertical section, of the briquetted bearing of Figure 2 after its first sintering operation.

During resintering, the reinfiltrating metal 28 melts, and flows through the pores of the cup or boat 27, infiltrating the pores of the bearing 24. The weight of the metal piece 28 is chosen to give the amount of reinfiltration desired, and this still further increases the density of the bearing 24 to give the denser reinfiltrated bearing indicated by the darker stippling (Figures 3 and 5).

The cup or boat 27 is then removed and, after cooling, the bearing 24 is ready for filling or charging with lubricant. This may be done by immersing the bearing 24 in a hot bath of oil, especially one which is boiling. It may also be done by immersing the bearing 24 in a heated oil bath in a vacuum tank from which the air has been removed by an air pump, causing the air and other gases to be drawn out of the cavity 25 through the pores of the bearing 24. A still further method of charging the bearing reservoir 25 with lubricant is to place it in a cylinder containing a thin grease or oil and applying pressure upon a piston to force the grease or oil through the pores of the bearing into the reservoir, void or cavity 25. The bearing is then ready for use, and in operation, it is found that the reinfiltration of the bearing with antimony has considerably improved its bearing qualities by reducing the friction at the bearing surface.

What I claim is:

1. A process of improving the bearing qualities of a sintered powdered metal bearing, comprising heating a compacted powdered metal bearing to a sintering temperature while in contact with a densifying metal to effect infiltration thereof into the pores of said bearing, subsequently reheating the sintered and densified bearing in contact with antimony to a temperature above the melting point of the antimony but below the melting point of the sintered powdered metal of the bearing, and thereby effecting infiltration of the antimony into the pores of said sintered bearing simultaneously with said reheating.

2. A process of improving the bearing qualities of a sintered powdered metal bearing, comprising heating a compacted powdered metal bearing to a sintering temperature while in contact with a densifying metal consisting of copper to a temperature above the melting point of the densifying metal and below the melting point of the sintered powdered metal of the bearing to effect infiltration thereof into the pores of said bearing, subsequently reheating the sintered and densified bearing in contact with antimony to a temperature above the melting point of the antimony but below the melting point of the sintered powdered metal of the bearing, and thereby effecting infiltration of the antimony into the pores of said sintered bearing simultaneously with said reheating.

3. A process of improving the bearing qualities of a sintered powdered metal bearing, comprising heating a compacted powdered metal bearing to a sintering temperature while in contact with a densifying metal consisting of copper-zinc alloy to a temperature above the melting point of the densifying metal and below the melting point of the sintered powdered metal of the bearing to effect infiltration thereof into the pores of said bearing, subsequently reheating the sintered and densified bearing in contact with antimony to a temperature above the melting point of the antimony but below the melting point of the sintered powdered metal of the bearing, and thereby effecting infiltration of the antimony into the pores of said sintered bearing simultaneously with said reheating.

4. A process of improving the bearing qualities of a sintered powdered metal bearing comprising placing on the bearing in surface-to-surface engagement therewith a porous cup having a bottom surface conforming substantially in configuration to the top surface of the bearing, placing a piece of antimony in the cup, heating the asembly of the bearing with the cup and antimony to a temperature above the melting point of the antimony but below the melting point of the sintered powdered metal of the bearing and thereby effect passage of the antimony through the pores of the cup into the pores of the bearing simultaneously with said heating.

5. A process of improving the bearing qualities of a sintered powdered metal bearing comprising placing on the bearing in surface-to-surface engagement therewith a porous cup having a bottom surface conforming substantially in configuration to the top surface of the bearing, placing in the cup a piece of bearing-improving reinfiltrating material containing metals chosen from the group consisting of antimony, lead and tin, heating the assembly of the bearing with the cup and reinfiltrating material to a temperature above the melting point of the reinfiltrating material but below the melting point of the sintered powdered metal of the bearing and thereby effect passage of the reinfiltrating material through the pores of the cup into the pores of the bearing simultaneously with said heating.

6. A process of improving the bearing qualities of a sintered powdered metal bearing comprising placing on the bearing in surface-to-surface engagement therewith a porous cup having a bottom surface conforming substantially in configuration to the top surface of the bearing, placing in the cup a piece of bearing-improving reinfiltrating metal alloy containing metals chosen from the group consisting of antimony, lead and tin, heating the assembly of the bearing with the cup and metal alloy to a temperature above the melting point of the metal alloy but below the melting point of the sintered powdered metal of the bearing and thereby effect passage of the metal alloy through the pores of the cup into the pores of the bearing simultaneously with said heating.

References Cited in the file of this patent

UNITED STATES PATENTS

| | | |
|---|---|---|
| 2,198,253 | Koehring | Apr. 23, 1940 |
| 2,365,562 | Koehring | Dec. 19, 1944 |
| 2,377,882 | Hensel | June 12, 1945 |
| 2,401,221 | Bourne | May 28, 1946 |
| 2,401,483 | Hensel | June 4, 1946 |
| 2,599,726 | Schluchter | June 10, 1952 |
| 2,606,831 | Koehring | Aug. 12, 1952 |
| 2,625,452 | Haller | Jan. 13, 1953 |

FOREIGN PATENTS

| | | |
|---|---|---|
| 611,466 | Great Britain | Oct. 29, 1948 |